US011028968B2

(12) United States Patent
Clodic et al.

(10) Patent No.: US 11,028,968 B2
(45) Date of Patent: Jun. 8, 2021

(54) METHOD FOR RECOVERING ENERGY FROM DRY ICE AT INFRA-ATMOSPHERIC PRESSURE

(71) Applicant: CRYO PUR, Palaiseau (FR)

(72) Inventors: Denis Clodic, Palaiseau (FR); Joseph Toubassy, Palaiseau (FR)

(73) Assignee: CRYO PUR, Palaiseau (FR)

( * ) Notice: Subject to any disclaimer, the term of this patent is extended or adjusted under 35 U.S.C. 154(b) by 309 days.

(21) Appl. No.: 15/563,644

(22) PCT Filed: Apr. 7, 2016

(86) PCT No.: PCT/FR2016/050807
§ 371 (c)(1),
(2) Date: Oct. 2, 2017

(87) PCT Pub. No.: WO2016/162643
PCT Pub. Date: Oct. 13, 2016

(65) Prior Publication Data
US 2018/0038548 A1    Feb. 8, 2018

(30) Foreign Application Priority Data

Apr. 8, 2015   (FR) ...................................... 1553020

(51) Int. Cl.
*F17C 9/04*     (2006.01)
*F17C 9/02*     (2006.01)
*F26B 5/00*     (2006.01)

(52) U.S. Cl.
CPC .................. *F17C 9/04* (2013.01); *F17C 9/02* (2013.01); *F26B 5/00* (2013.01);
(Continued)

(58) Field of Classification Search
CPC ........ F17C 9/02; F17C 9/04; F17C 2223/013; F17C 2223/038; F17C 2223/043;
(Continued)

(56) References Cited

U.S. PATENT DOCUMENTS 2,352,775 A  *  7/1944  Dittmer .................... F17C 9/02
                                                      62/48.1
2,559,095 A  *  7/1951  Storm, Jr. ............... F25D 3/125
                                                      62/166
(Continued)

FOREIGN PATENT DOCUMENTS

DE    10 2013 014 912 A1   3/2015
GB         678 995 A       9/1952
WO      2010/100136 A2     9/2010

OTHER PUBLICATIONS

International Search Report for PCT/FR2016/050807, dated Jul. 25, 2016.

*Primary Examiner* — Frantz F Jules
*Assistant Examiner* — Erik Mendoza-Wilkenfel
(74) *Attorney, Agent, or Firm* — Sughrue Mion, PLLC

(57) ABSTRACT

A method of recovering energy produced by the change of phase of dry ice using a device having an enclosure (2) containing dry ice at an infra-atmospheric pressure and at a solidification temperature corresponding to the infra-atmospheric pressure; and a primary energy recovery circuit (3), in which a heat transfer fluid circulates, passing through the enclosure. The method involves passage of the heat transfer fluid into the primary circuit (3), this step causing the heating of the dry ice and its change of phase into CO2 and the cooling of the heat transfer fluid; extraction of the CO2 contained in the enclosure (2); and substantially continuous lowering of the pressure of the enclosure (2) to an infra-atmospheric pressure.

8 Claims, 1 Drawing Sheet

(52) U.S. Cl.
CPC ............... *F17C 2221/013* (2013.01); *F17C 2223/0138* (2013.01); *F17C 2223/031* (2013.01); *F17C 2225/0123* (2013.01); *F17C 2227/0323* (2013.01); *F17C 2227/0327* (2013.01); *F17C 2227/0379* (2013.01); *F17C 2250/032* (2013.01); *F17C 2250/043* (2013.01); *F17C 2250/0626* (2013.01); *F17C 2250/0636* (2013.01); *F17C 2260/046* (2013.01)

(58) Field of Classification Search
CPC ...... F17C 2223/0192; F17C 2227/0369; F17C 2227/0372; F17C 2227/0376; F17C 2227/0379; F25D 3/12; F25D 3/122; F25D 3/125; F25D 3/14; F26B 5/04; F25B 19/00
USPC .................................. 62/54.2, 100
See application file for complete search history.

(56) References Cited

U.S. PATENT DOCUMENTS

| | | | | |
|---|---|---|---|---|
| 4,699,570 | A | * | 10/1987 | Bohn ................ F04B 41/06 417/22 |
| 5,787,716 | A | * | 8/1998 | Allen, Jr. ............ A23L 3/361 62/381 |
| 2003/0014879 | A1 | | 1/2003 | Horigane |
| 2012/0174623 | A1 | * | 7/2012 | Clodic ................ B01D 7/02 62/617 |

* cited by examiner

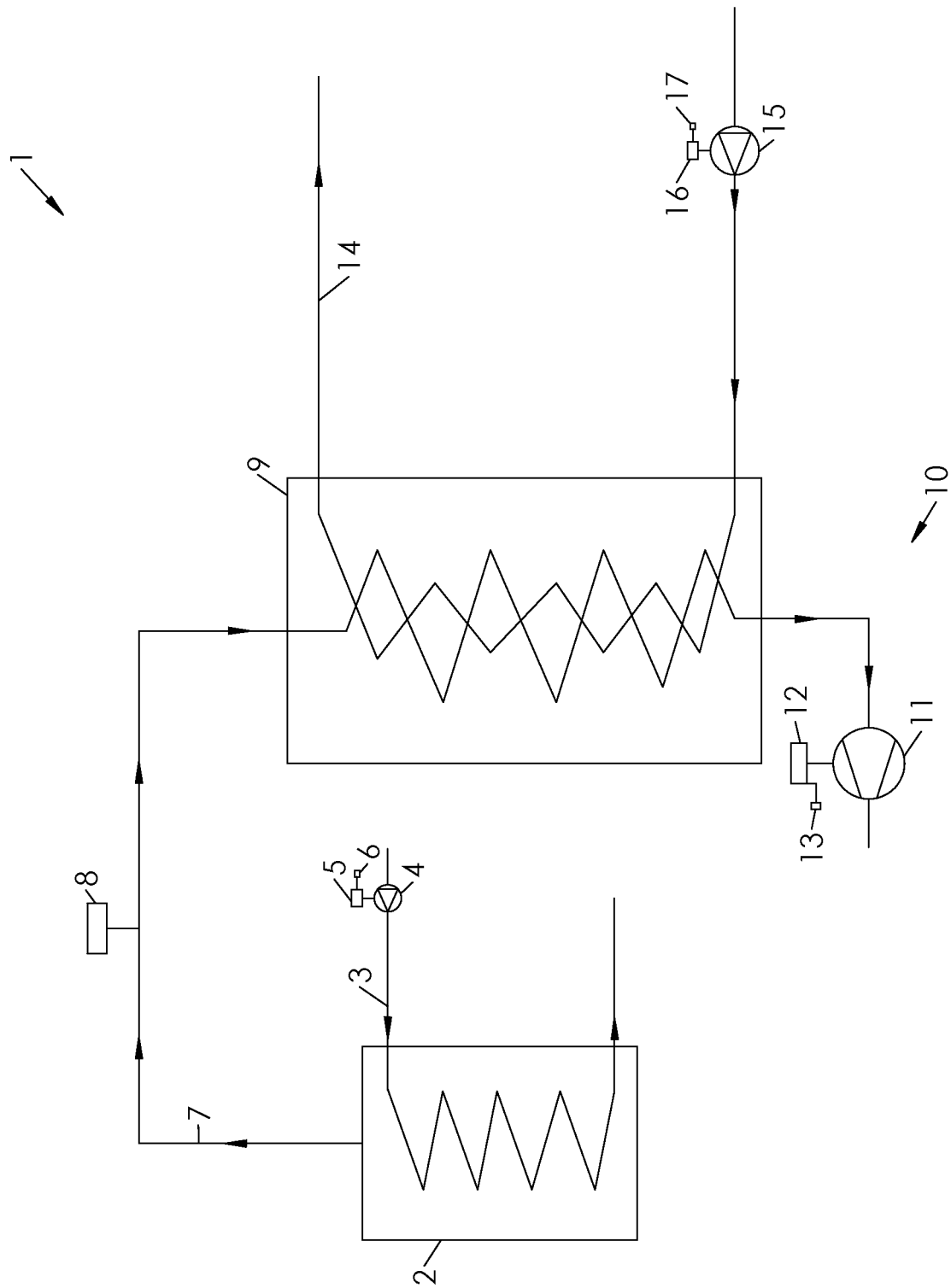

METHOD FOR RECOVERING ENERGY FROM DRY ICE AT INFRA-ATMOSPHERIC PRESSURE

This application is a National Stage of International Application No. PCT/FR2016/050807 filed Apr. 7, 2016, claiming priority based on French Patent Application No. 1553020 filed Apr. 8, 2015, the contents of all of which are incorporated herein by reference in their entirety.

The invention relates to a method and a device for recovering cold heat using dry ice at infra-atmospheric pressure.

The expression "infra-atmospheric" here designates pressures below atmospheric pressure.

Carbon dioxide ($CO_2$) is used in numerous and varied applications, ranging from the culinary field to heavy industry.

In the gas industry, for example, methane of fossil origin or biological origin contains $CO_2$ that should be extracted, particularly prior to the transport of the methane. Indeed, before being transported, the methane gas is liquefied at liquefaction temperatures close to $-160°$ C. at atmospheric pressure. Now, under the same conditions of pressure, the $CO_2$ is solidified at temperatures close to $-80°$ C. Consequently, the liquefied methane is saturated in dry ice, which is problematic for industrial facilities.

Logically, therefore, the $CO_2$ is extracted by different known means, particularly by using cleaning techniques. The extracted $CO_2$ is then released into the atmosphere or recycled for other applications.

The present invention is particularly concerned with the recycling of $CO_2$ in industrial facilities.

The French patent application published under number FR 2 820 052 (ARMINES) introduces a method and a system for extracting (capturing) carbon dioxide by anti-sublimation at atmospheric pressure, also known by the expression solid condensation. The $CO_2$ is captured by anti-sublimation at a temperature on the order of $-80°$ C. and at a pressure of 0.89 bar absolute in an anti-sublimation evaporator. A heat transfer fluid passes into the anti-sublimation evaporator, which, once filled with dry ice, changes over to the defrosting phase. The solid $CO_2$ is liquefied and the heat transfer fluid recovers the liquefaction energy. The gross enthalpy variation is 228 kJ/kg. The transfer efficiency of the heat exchangers is 90%. The energy recovered by the heat transfer fluid is therefore 205 kJ/kg. Moreover, the $CO_2$ changes over from an initial pressure of 0.89 bar absolute in the solid phase at a pressure of more than 5.2 bar in the liquid phase.

This earlier method has major deficiencies. The thermodynamic properties of the $CO_2$ are not optimally exploited. A greater amount of energy could be recycled through the use of a different method, in order to recover more cold heat from the dry ice.

To that end, in the first instance, a method is proposed of recovering energy from the change of phase of the dry ice. Said method is implemented by means of a device comprising:
   an enclosure containing dry ice at an infra-atmospheric pressure;
   a primary energy recovery circuit, in which a heat transfer fluid circulates, passing through the enclosure.

Said method comprises the following steps:
   passage of the heat transfer fluid into the primary circuit, this step causing the heating of the dry ice and its change of phase into $CO_2$ and the cooling of the heat transfer fluid;
   extraction of the $CO_2$ contained in the enclosure.

Said method comprises a step of a substantially continuous lowering of the pressure of the enclosure to an infra-atmospheric pressure.

Various additional characteristics can be foreseen, alone or in combination:
   the $CO_2$ extracted from the enclosure is gaseous;
   the method comprises a step of conveyance of the $CO_2$ extracted from the enclosure into a heat exchanger, where it transfers part of its heat to a heat transfer fluid circulating in a secondary circuit;
   the method comprises a step of substantially continuously measuring the pressure in a suction line by means of a pressure sensor;
   the method comprises a step of transmission of the pressure measured by the pressure sensor to a central unit;
   the method comprises a step of regulating the pressure in the enclosure and in the suction line by means of a vacuum pump located at one end of the suction line;
   the pressure in the enclosure is about 0.00055 bar absolute.

In the second instance, an energy recovery device is proposed that is capable of implementing an energy recovery method as previously described, said device comprising:
   an enclosure capable of containing dry ice at an infra-atmospheric pressure and at a solidification temperature corresponding to the infra-atmospheric pressure;
   a primary energy recovery circuit, in which a heat transfer fluid circulates, passing through the enclosure;
   a suction line enabling the $CO_2$ to be extracted from the enclosure.

The suction line is provided with means capable of extracting the $CO_2$ and of enabling a continuous lowering of pressure in the enclosure to an infra-atmospheric pressure.

Various additional characteristics can be foreseen, alone or in combination:
   the device comprises a heat exchanger through which the suction line passes, a secondary circuit also passing through the heat exchanger, the suction line further comprising a pressure sensor, and the means capable of extracting the $CO_2$ being a vacuum pump;
   the device comprises a central unit capable of processing the information from the pressure sensor and of regulating the extraction power of the vacuum pump.

Other objects and advantages of the invention will be seen from the description of one embodiment, provided below with reference to the FIGURE representing a schematic view of a device for recovering energy from dry ice.

Represented in the FIGURE is a device 1 comprising an enclosure 2 through which a primary energy recovery circuit 3 passes.

The primary circuit 3 comprises a primary pump 4. The primary pump 4 is controlled by a primary variable-speed motor 5, which in turn is controlled by a primary power converter 6.

A heat transfer fluid circulates in the primary circuit 3. The heat transfer fluid can be liquid or gaseous. In the case in which it is gaseous, the primary pump 4 is a compressor.

The device 1 comprises a suction line 7 fitted with a suction pressure sensor 8.

The suction line 7 passes through a heat exchanger 9 before coming out again at one end 10. The end 10 is provided with a vacuum pump 11 controlled by a frequency converter 12, which is controlled by a control device 13.

A secondary heat recovery circuit 14 also passes through the heat exchanger 9. A heat transfer fluid circulates in the secondary circuit 14. The secondary circuit 14 comprises a secondary pump 15. The secondary pump 15 is controlled by a secondary variable-speed motor 16, which in turn is controlled by a secondary power converter 17.

The energy recovery method will now be described with reference to the following table:

TABLE

| Saturation temperature (° C.) | Pressure (bar absolute) | Density (kg/m$^3$) | Latent heat of sublimation (kJ/kg) |
|---|---|---|---|
| −140 | 0.00055 | 0.002 | 593.75 |
| −135 | 0.00134 | 0.005 | 592.0 |
| −130 | 0.00304 | 0.011 | 590.17 |
| −125 | 0.00646 | 0.023 | 588.25 |
| −120 | 0.01302 | 0.045 | 586.24 |
| −115 | 0.02500 | 0.083 | 584.11 |
| −110 | 0.04598 | 0.149 | 581.87 |
| −105 | 0.08137 | 0.257 | 579.50 |
| −100 | 0.13907 | 0.427 | 577.0 |
| −95 | 0.23033 | 0.689 | 574.32 |
| −90 | 0.37082 | 1.082 | 571.49 |
| −85 | 0.58193 | 1.660 | 568.49 |
| −80 | 0.89239 | 2.493 | 565.31 |
| −75 | 1.3402 | 3.678 | 561.92 |
| −70 | 1.9753 | 5.341 | 558.31 |
| −65 | 2.8626 | 7.655 | 554.44 |
| −60 | 4.0861 | 10.86 | 550.25 |
| −57 | 5.0258 | 13.35 | 547.54 |

The data furnished in the table relate to the $CO_2$. Starting with the left column, this table provides the sublimation temperature, the absolute saturation pressure, the density and the latent heat of sublimation.

These data are furnished by the Refprop 9 software with additional calculations for the latent heat of sublimation, based on the formulations from the book entitled *Thermodynamic properties in SI* by W. C. Reynolds of the Department of Mechanical Engineering of Stanford University.

To simplify, the energy is broken down into two parts. One of the parts can be transformed into mechanical energy, while the other cannot. The part transformable into mechanical energy is called exergy. The exergy therefore makes it possible to measure the quality of energy.

With regard to the $CO_2$, the lower its temperature, the higher the exergetic value of the latent heat.

$CO_2$ in solid phase is called dry ice. Initially, the enclosure 2 comprises a given mass of dry ice. The pressure in the enclosure 2 is infra-atmospheric, i.e., it is lower than atmospheric pressure, which is about 1 bar.

This infra-atmospheric pressure is maintained constant by the vacuum pump 11. In this embodiment, the pressure in the enclosure is 0.00055 bar absolute, or a sublimation temperature of −140° C. The enclosure 2 is lined with efficient insulation in order to reduce exchanges of heat with the environment.

The heat transfer fluid circulating in the primary circuit 3 passes through the enclosure 2 and is cooled by exchange of heat with the dry ice.

The dry ice is heated from the action of the heat transfer fluid and is instantly sublimated when its temperature exceeds −140° C. at a pressure of 0.00055 bar absolute.

The pressure and temperature then naturally tend to increase under the effect of the sublimation of the dry ice. To prevent this, the vacuum pump 11 extracts more gaseous $CO_2$ in order for the pressure of 0.00055 bar absolute to remain constant so that the sublimation temperature is maintained at −140° C. Indeed, as explained above, the higher the exergetic value of the latent heat, the lower the sublimation temperature.

The energy recovery occurs until the complete sublimation of the dry ice. Once the dry ice has completely disappeared, the enclosure 2 is reloaded with dry ice.

The regulation of the pressure in the enclosure 2 is achieved by measuring the pressure in the suction line 7 by means of a suction pressure sensor 8.

The value of the pressure in the suction line 7 is continuously sent to a central unit, not shown in the FIGURE.

When the pressure in the suction line 7 exceeds the target pressure, in this instance 0.00055 bar absolute, then the central unit controls the vacuum pump 11, via the control device 13 and the frequency converter 12, to extract more gaseous $CO_2$ in order for the target pressure to be reached and remain constant in the suction line 7. The pressures in the enclosure 2 and in the suction line 7 are substantially identical.

The gaseous $CO_2$ exiting the enclosure 2 passes through the heat exchanger 9 and releases part of its sensible heat to the heat transfer fluid circulating in the secondary circuit 14.

The flow rates of the heat transfer fluids in the primary circuit 3 and in the secondary circuit 14 can be adapted so that the heat exchanges with the dry ice for the primary circuit 3 and with the gaseous $CO_2$ for the secondary circuit 14 are as efficient as possible.

Thus, part of the sensible heat is recovered by the secondary circuit 14. The sensible heat, in contrast to the latent heat, corresponds to the energy released without any change of phase of the $CO_2$.

Advantageously, the heat transfer fluid in the secondary circuit 14 and the $CO_2$ in the suction line 7 circulate in counter-current.

The heat transfer fluid should be able to not solidify at these cryogenic temperatures close to −140° C. Propane can be used advantageously as a heat transfer fluid for this reason.

The heat transfer in the heat exchanger 9 takes place over a wide range of temperatures. Typically, this range extends from −140° C. to 20° C. The sensible heat is about 120 kJ/kg.

In the enclosure 2, the latent heat of sublimation is about 594 kJ/kg, in reference to the table.

The total recoverable heat is therefore about 714 kJ/kg. With equipment enabling heat exchange at 90% efficiency, the total heat effectively recovered is about 643 kJ/kg.

The method and device as described enable a recovery of energy from dry ice that is much more efficient, by advantageously exploiting the thermodynamic properties of carbon dioxide.

The invention claimed is:

1. A method of recovering energy produced by a phase changing of dry ice, said method being implemented by a device (1) comprising:
    an enclosure (2) containing the dry ice at an infra-atmospheric pressure;
    a primary energy recovery circuit (3), in which a primary heat transfer fluid circulates, passing through the enclosure (2);
    the method comprising the following steps:
    passage of the heat transfer fluid into the primary circuit (3) causing the heating and the phase changing of the dry ice into gaseous $CO_2$ and the cooling of the heat transfer fluid;
    extraction of the gaseous $CO_2$ contained in the enclosure (2);
    a substantially continuous lowering of the pressure of the enclosure (2) to the infra-atmospheric pressure; and conveyance of the gaseous $CO_2$ extracted from the enclosure (2) into a heat exchanger (9) in which the gaseous $CO_2$ transfers heat to a secondary heat transfer fluid circulating in a secondary circuit (14).

2. The method according to claim 1, comprising substantially continuously measuring the pressure in a suction line (7) by a pressure sensor (8).

3. The method according to claim 2, comprising transmission of the pressure measured by the pressure sensor (8) to a central unit.

4. The method according to claim 3, comprising regulating the pressure in the enclosure (2) and in the suction line (7) by a vacuum pump (11) located at one end of the suction line (7).

5. The method according to claim 1, wherein the pressure in the enclosure (2) is about 0.00055 bar absolute.

6. An energy recovery device (1) configured to implement the energy recovery method according to claim 1, said device (1) comprising:
- an enclosure (2) capable of containing dry ice at an infra-atmospheric pressure and at a solidification temperature corresponding to the infra-atmospheric pressure;
- a primary energy recovery circuit (3), in which a heat transfer fluid circulates, passing through the enclosure (2);
- a suction line (7) enabling the $CO_2$ to be extracted from the enclosure (2),
- wherein the suction line (7) is provided with means capable of extracting the $CO_2$ and of enabling a continuous lowering of pressure in the enclosure (2) to an infra-atmospheric pressure.

7. The device (1) according to claim 6, comprising a heat exchanger (9) through which a suction line (7) passes, a secondary circuit (14) also passing through the heat exchanger (9), the suction line (7) further comprising a pressure sensor (8) and the means capable of extracting the $CO_2$ being a vacuum pump (11).

8. The device (1) according to claim 7, comprising a central unit configured to process information from the pressure sensor (8) and to regulate extraction power of the vacuum pump (11).

* * * * *